United States Patent [19]

Cugnini

[11] Patent Number: 4,769,841

[45] Date of Patent: Sep. 6, 1988

[54] RECEIVER FOR COMPATIBLE FM STEREOPHONIC SYSTEM UTILIZING COMPANDING OF DIFFERENCE SIGNAL

[75] Inventor: Aldo G. Cugnini, Tarrytown, N.Y.

[73] Assignee: Broadcast Technology Partners, Bloomfield Hills, Mich.

[21] Appl. No.: 71,404

[22] Filed: Jul. 9, 1987

[51] Int. Cl.⁴ .......... H04H 5/00

[52] U.S. Cl. .......... 381/13; 381/106; 333/14

[58] Field of Search .......... 381/2, 3, 4, 13, 106; 333/14

[56] References Cited

U.S. PATENT DOCUMENTS

| | | | |
|---|---|---|---|
| 4,388,493 | 6/1983 | Maisel | 179/1 GD |
| 4,485,483 | 11/1984 | Torick et al. | 381/14 |
| 4,534,054 | 8/1985 | Maisel | 381/4 |
| 4,602,380 | 7/1986 | Stebbings | 381/13 |
| 4,602,381 | 7/1986 | Cugnini et al. | 381/13 |
| 4,704,727 | 11/1987 | Beard | 381/13 |

*Primary Examiner*—Forester W. Isen
*Attorney, Agent, or Firm*—Spencer E. Olson

[57] ABSTRACT

In the receiver of an FM stereo broadcasting system which transmits both the usual stereo difference signal S and a compressed version S′ of the difference signal compressed according to a compression characteristic such that signals in a lower portion of the audio frequency spectrum are not compressed and signals having frequencies above said portion are compressed, according to a desired characteristic, instead of complementarily expanding the compressed difference signal, only those signal frequencies that have been compressed at the transmitter are expanded.

7 Claims, 2 Drawing Sheets

NOISE SPECTRA

RECEIVER FOR COMPATIBLE FM STEREOPHONIC SYSTEM UTILIZING COMPANDING OF DIFFERENCE SIGNAL

BACKGROUND OF THE INVENTION

This invention relates to FM broadcasting systems and, more particularly, to an improved receiver for an FM stereophonic broadcasting system which utilizes companding of the stereo difference signal.

U.S. Pat. No. 4,485,483, the disclosure of which is hereby incorporated herein by reference, describes a stereophonic broadcasting system which utilizes companding of the difference signal and is compatible with existing FM receivers. As shown in FIG. 4 of the patent, stereophonically related audio frequency source signals L and R are matrixed to obtain stereophonic sum and difference signals M and S, respectively. At the transmitter, the difference signal is used to amplitude-modulate a first sub-carrier signal and at the same time is compressed and used to amplitude-modulate a second sub-carrier of the same frequency but in quadrature phase relationship with the first. Suppressed-carrier, double-sideband modulation is employed, with the frequency of the sub-carrier signal being sufficiently high to assure a frequency gap between the lower sidebands of the modulated sub-carrier signals and the sum signal. A conventional low-level phase reference pilot signal, lying within the aforementioned gap, is provided for detection purposes at the receiver. The composite baseband signal comprising the sum signal, the two modulated sub-carrier signals, and the pilot signal and which will sometimes be referred to herein as the "FMX" signal is frequency modulated onto a high frequency carrier for broadcast. The receiver includes a demodulator for deriving the sum signal, the usual difference signal S and the compressed difference signal S', and an expander for expanding the derived compressed difference signal. The expander may be of the type described in commonly assigned U.S. Pat. No. 4,602,381, the disclosure of which is also hereby incorporated herein by reference, which uses the difference signal S as a reference signal for controlling the expansion of the received compressed difference signal S' so as to cause the amplitude of the expanded difference signal to equal the level of the uncompressed difference signal. The expanded noise-reduced version of the difference signal is combined with the received sum signal to obtain the original audio frequency source signals L and R. In addition to improving the quality of the received signal, the system increases the broadcast coverage area over that of current biphonic service.

Although the "FMX" signal transmitted by the broadcasting system described in the aforementioned patents can be compatibly received with properly aligned conventional receivers, as is pointed out in commonly assigned patent application Ser. No. 030,223 filed Mar. 25, 1987 by Emil L. Torick, the the disclosure of which is hereby incorporated herein by reference, should the receiver fail to maintain the proper phase relationship between the pilot signal and the sub-carrier, there may be crosstalk of the compressed signal into the uncompressed difference signal and, depending on the direction of phase misalignment, may add to or subtract from the normal difference signal. If the phase error is negative, the crosstalk will be out-of-phase and may cause a perceived narrowing of the stereo stage width, and if the phase error is positive there may be an apparent widening of the stereo image.

The problem is exacerbated when the receiver is moving because of multipath disturbances caused by reception of directly transmitted signals as well as delayed reflections of the transmitted signal from man-made structure of the surrounding terrain. Depending on the delay intervals and the number of delayed reflections received, multipath can decrease the level of the received RF signal and cause noisy reception or, in some cases, complete signal dropouts. In addition to RF signal fading, the summation of the multipath signals at the receiver may distort the phase relationship between the pilot signal and the stereo difference signal, and with the inclusion of the compressed difference signal S' in the transmitted signal, momentary phase errors can result in bursts of crosstalk, as well as noise. Since the level of the compressed difference signal is generally higher than that of the uncompressed difference signal, if the phase error is such as to cause crosstalk summation of the two stereo difference signals loud bursts of sound may be heard.

According to the teaching of the aforementioned co-pending Torick application Ser. No. 030,223, the composite "FMX" signal can be made more compatible with conventional FM stereo receivers, particularly in the presence of multipath propagation, by adjusting the relative amplitudes of different portions of the audio frequency spectrum of the compressed difference S' in approximate correspondence with the response of the human hearing mechanism to sound loudness level. The significance of this modification of the compressed difference signal will be seen from FIG. 1 which illustrates the amplitude versus frequency spectrum of the uncompressed and compressed difference channels of the "FMX" signal described earlier. The compressed signal, illustrated in the lower curve, has the same upper and lower frequency limits as the uncompressed stereo difference channel, has an amplitude of 20 dB over the range from about 1,000 Hz to about 15,000 Hz, rolls off from about 1,000 Hz to about 100 Hz at a rate of about 6 dB per octave to a level of 0 dB, that is, to the level of the uncompressed difference signal, and remains at that level until the lower limit of the passband is reached. Stated another way, the compressed difference signal used to amplitudemodulate the quadrature carrier at the transmitter has the same amplitude as the uncompressed difference signal from the lower end of the illustrated passband up to a frequency of about 100 Hz, then increases to a level of about 20 dB at a frequency of about 1,000 Hz at which it is maintained for the balance of the spectrum. Alternatively, instead of the compression characteristic having a zero dB "shelf" over the frequency range between about 20 Hz and 100 Hz, it may continue to roll off at the 6 dB per octave rate, as indicated by the dashed line 8.

While the described modification of the amplitude/-frequency spectrum of the compressed stereo difference signal makes the composite "FMX" signal more compatible with conventional FM stereo receivers, unless precautions are taken in designing the receiver for the composite "FMX" signal, under certain conditions the noise at the output of the receiver could be worse than at the output of a conventional receiver. That is to say, if the filter of the receiver's expander has a characteristic complementary to the encoding filter characteristic, the expander filter would boost all of the low frequencies and under certain conditions could boost them to a level at which they would be in excess of what they would be in a normal FM stereo receiver. Moreover, boosting of all low frequency signals could affect the location of the knee of the expander characteristic in such a way as to cause the expander to mistrack under certain disturbance conditions.

A primary object of the present invention is to provide a receiver for use in an "FMX" broadcasting system wherein the characteristic of the transmitted compressed difference signal corresponds approximately to the loudness response of the human ear.

SUMMARY OF THE INVENTION

In an FM stereo broadcasting system in which the usual stereo difference signal S and a compressed version S' of the difference signal are both transmitted, the relative amplitudes of different portions of the audio frequency spectrum of the compressed difference signal S' are adjusted so as to be in approximate correspondence with the response of the human hearing mechanism to sound loudness level. In the receiver of the system, instead of complementarily expanding the compressed difference signal, the expander is designed to expand only those signal frequencies that have been compressed. That is to say, the expander operates only on received signals that were compressed at the transmitter and signals having frequencies that were not compressed by-pass the expander and are not affected thereby.

BRIEF DESCRIPTION OF THE DRAWINGS

Other objects, features and advantages of the invention, and a better understanding of its construction and operation, will be had from the following detailed description, when considered in conjunction with the accompanying drawings, in which.

DETAILED DESCRIPTION OF PREFERRED EMBODIMENT

Figure 1:
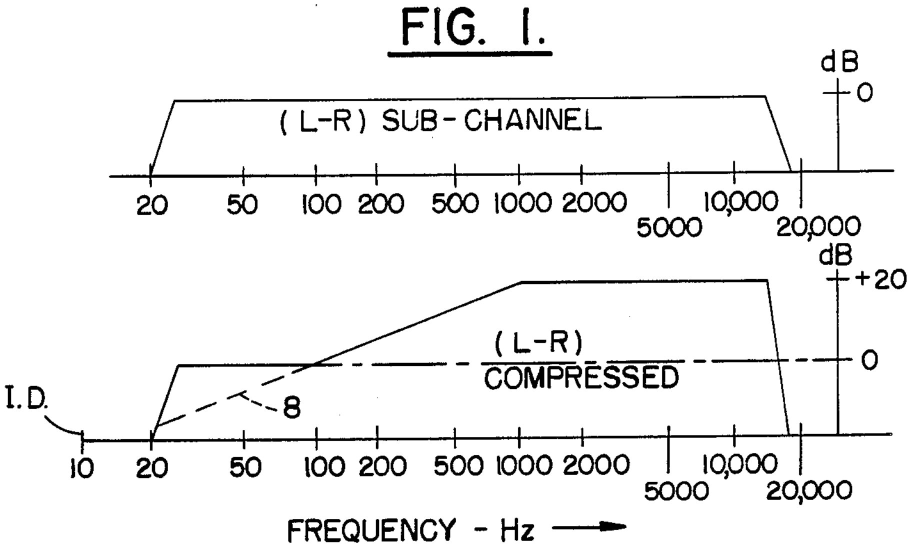
FIG. 1, to which reference has already been made, illustrates the amplitude versus frequency spectrum of the uncompressed and compressed difference channels of a transmitted "FMX" signal.
Figure 2:
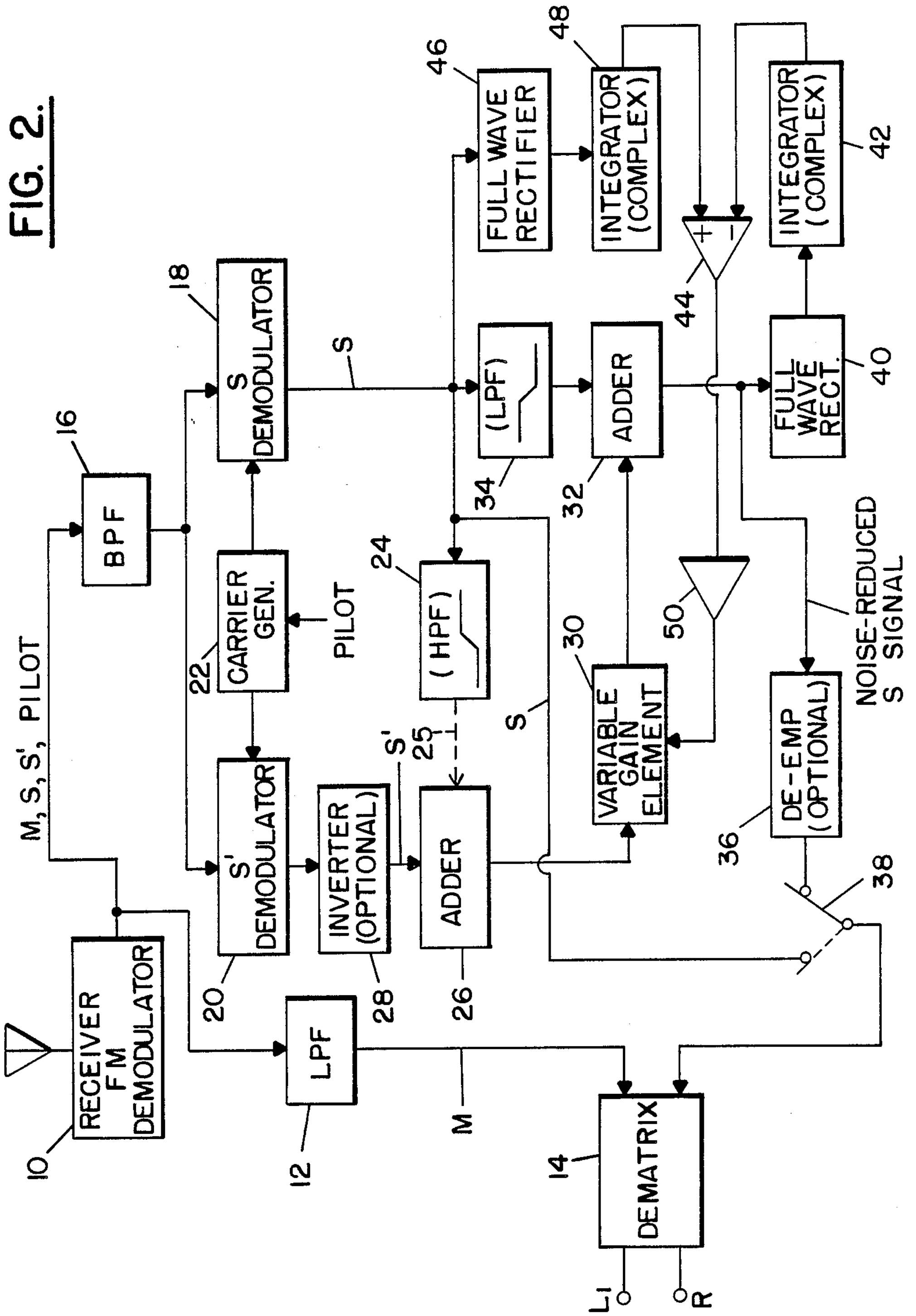
FIG. 2 is a simplified block diagram of a receiver constructed in accordance with the present invention.

The "FMX" broadcasting system, in which use of the receiver of FIG. 2 intended, is compatible with the existing two-channel stereo system approved by the FCC in that the transmitted signal has a baseband spectrum comprising a monophonic channel M from about 50 Hz to 15 kHz, a 19 kHz pilot, a conventional stereo difference channel S from 23 kHz to 53 kHz, and in accordance with the teaching of U.S. Pat. No. 4,485,483, a compressed difference signal S', the two difference signals being amplitude-modulated on respective 38 kHz quadrature sub-carriers. Following the teaching of the above-mentioned Torick application Ser. No. 030,223, the compressed difference signal may have the amplitude versus frequency spectrum illustrated in FIG. 1, namely, the same amplitude as the uncompressed difference signal from the lower end of the illustrated passband up to a frequency of about 100 Hz, and increasing to a level of about 20 dB at a frequency of about 1,000 Hz at which it is maintained for the balance of the spectrum.

FIG. 2 is a block diagram of a receiver according to the invention which in the interest of simplicity omits some of the more conventional FM receiver circuits and will be only briefly mentioned as necessary. A received "FMX" signal is detected and amplified in the RF and IF stages (not shown) of a receiver/FM demodulator 10 and demodulated in any of the known FM detection circuits (not shown) to derive the audio signals contained in the received signal, namely, the signals M, S, S' and the pilot. The monophonic sum signal is separated from the higher frequency components of the composite signal by a low-pass filter 12 and applied as one input to a dematrix circuit 14 of conventional design. The remaining components of the composite signal are selected by a bandpass filter 16 designed to pass frequencies in the band from 23 kHz to 53 kHz and to reject frequencies outside this band and applied to an "S" demodulator 18 and also to an "S'" demodulator 20. The pilot signal is derived by conventional means (not shown) and applied to a carrier generator 22 which regenerates quadrature versions thereof, which are applied to demodulators 18 and 20, respectively.

In order that only those frequencies which have been compressed are expanded, the signal S from demodulator 18 is filtered by a filter 24 and then added in an adder 26 of the compressed stereo difference signal S' from demodulator 20. Filter 24 has substantially the same pass characteristic as the filter embodied in the encoder of the transmitter, that is, the characteristic illustrated in the lower portion of FIG. 1, so as to pass only those frequencies that have been compressed. The dotted line connection 25 from filter 24 to adder 26 signifies that the signal S is not necessarily added to the compressed difference signal S' before being applied to the variable gain element 30 of an expander, which preferably is of the type described in commonly assigned U.S. Pat. No. 4,602,381. In the event the audio signals contained in signals S and S' are reversed in phase relative to each other for minimizing crosstalk in conventional FM stereo receivers as taught by the aforementioned Torick application Ser. No. 030,223, an inverter 28 is provided to invert the phase of the signal S' before it is added to the uncompressed difference signal S. Whether or not the inverter 28 is present, with filter 24 designed to have the proper pass characteristic the frequency characteristics of the signals S and S' are identical at the time they are added together.

The sum of the compressed difference signal S' and the filtered signal S is applied to the input of variable gain element 30, the output of which is added in an adder 32 to a filtered version of the uncompressed difference signal S produced at the output of a "low pass" filter 34. Filter 34 is designed to have a pass characteristic such that if its output were summed with the output of filter 24 the resulting signal would have the flat frequency response shown in the upper portion of FIG. 1. The noise-reduced S signal appearing at the output of added 32 is applied via an optional de-emphasis circuit 36 to a second input of dematrix 14 when a switch 38 is in the position shown. The output of adder 32 is also applied to a full-wave rectifier 40 which produces a direct current output signal having a level proportional to the amplitude of the signal appearing at the output of the adder. This direct current signal is applied to an integrator 42 which preferably is of the complex form described in U.S. Pat. No. 4,376,916 which includes a plurality of signal paths having differing time constants. The output signal from integrator 42 is applied as one input to a comparator 44 which, for example may be an operational amplifier with the signal from integrator 42 applied to its negative terminal.

The uncompressed difference signal S produced at the output of demodulator 18 is applied to a second full-wave rectifier 46 produces a direct current output signal having a level proportional to the amplitude of the difference signal S. This direct current signal is applied to a second integrator 48, which may have the same construction as integrator 42, the output of which is applied as a second input to comparator 44, more specifically, to the positive input terminal of the operational amplifier. Any output signal from comparator 44 representing a difference in the amplitude of the two applied signals is amplified by a suitable amplifier 50 to produce a dynamically varying control signal which is applied to the control element of variable gain element 30 to control the gain thereof.

Ones skilled in this art will recognize that the described receiver can also reproduce monophonic or conventional two-channel stereo signals. When a monaural broadcast is being received the output of receiver 10 comprises only the sum signal M which is applied to dematrix 14, which produces the sum signal (L+R) at each of its output terminals. When a conventional two-channel stereo signal is received, the M and S signals will be produced at the output of receiver/demodulator 10 as before; the M signal is applied to one input of dematrix 14, and the S signal, when switch 38 is switched to the dotted line position, preferably automatically, will be applied to the second input of dematrix 14 which, in conventional fashion, produces L and R signals at its respective output terminals for application to left and right loudspeakers.

It will be evident from the foregoing description that the described circuit expands only those signal frequencies that were compressed in the encoding process with the signals contributing however, to the generation of the control signal for the variable gain element and also to the noise-reduced output difference signal. Although "high pass" filter 24 and "low pass" filter 34 have been illustrated as separate components, it is possible to provide their respective functions in a single filter which comprises essentially a high pass filter and a subtractor for generating the appropriate low pass function. Stated another way, the filter 24 can be designed to have any desired arbitrary function.

Figure 3:
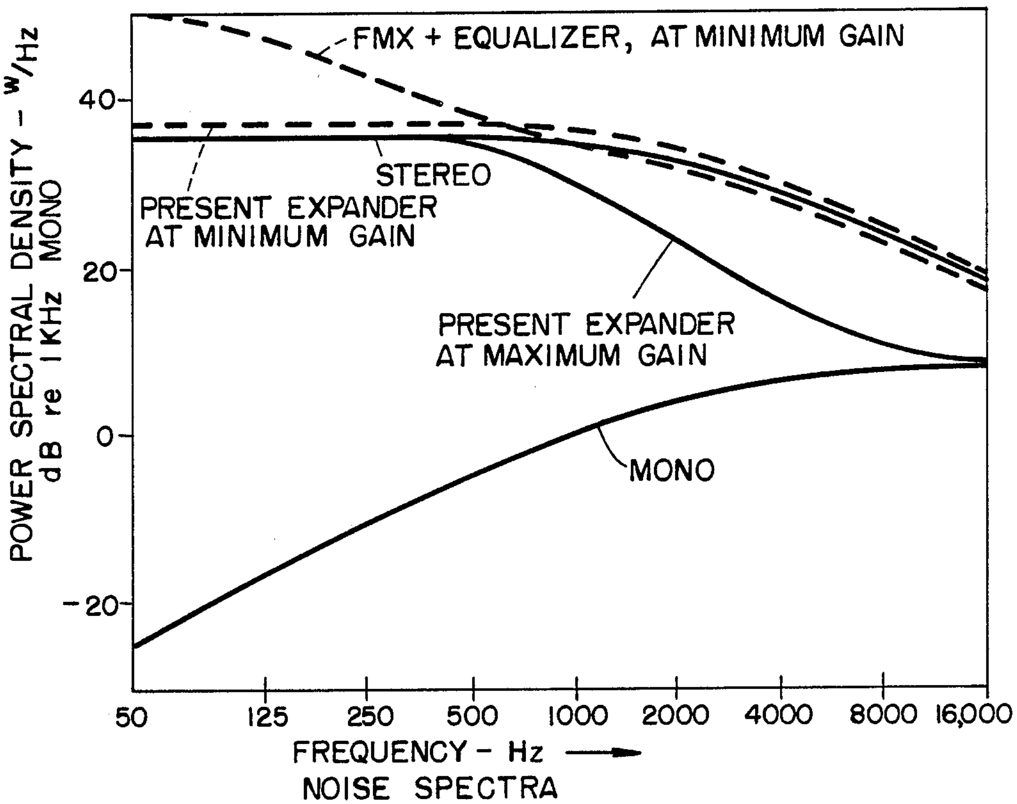
FIG. 3 is a set of curves which illustrate the beneficial effect of the system of FIG. 2 on the frequency response of the noise that appears at the output of the receiver.

The advantage of the described circuit over merely using a complementary filter in the expander as suggested in the aforementioned application Ser. No. 030,223, is graphically depicted in FIG. 3 labeled "Noise Spectra", which illustrates the frequency response of the noise that will be present at the output of the receiver after multiplexing and de-emphasis for five different types of reception, namely, monophonic, stereo, FMX with equalizer (i.e., a complementary filter in the expander), and the expander according to the present invention at maximum and minimum gain. When only a complementary filter is used in the expander, under very noisy reception conditions, the complex integrators may erroneously generate a control signal which is governed by the noise itself, rather than by the program material. Under this condition, the expander gain will approach a minimum value, and the frequency response of the noise will be as illustrated by the "minimum gain" curves of FIG. 3. It is seen that FMX with equalizer at minimum gain will have a low frequency noise spectrum which is higher in level than that for stereo or FMX reception, whereas the present expander has a low frequency noise spectrum only slightly higher in level than that for stereo.

I claim:

1. A receiver for receiving an FM multiplex signal derived from left and right audio stereo signals and including a sum signal, a stereo difference signal S amplitude-modulated on a first sub-carrier, a compressed version S' of said stereo difference signal compressed according to a compression characteristic approximating the loudness response of the human ear such that signals having frequencies in a predetermined lower portion of the audio frequency spectrum are not compressed, said compressed difference signal S' being amplitude-modulated on a second sub-carrier, and a pilot signal, said receiver comprising:

means for deriving said sum signal, said difference signal S and said compressed difference signal S';

expander means including a variable gain element having input, output and control terminals, means for applying said compressed difference signal S' to the input terminal of said variable gain element, and control signal generating means for generating and applying a control signal to the control terminal of said variable gain element for controlling the gain thereof, said control signal generating means including means for dynamically comparing a first signal proportional to said difference signal S against a second signal which is proportional to a third signal produced by summing the signal appearing at the output terminal of said variable gain element and a signal comprising said predetermined lower portion of said difference signal S, and means for dematrixing said sum signal and said third signal and producing said left and right audio stereo signals.

2. A receiver according to claim 1, wherein said means for applying said compressed difference signal S' to the input terminal of said variable gain element includes means for summing said signal S' with a signal derived from said difference signal S which has an amplitude versus frequency response which corresponds to said compression characteristic above said predetermined lower portion and applying the resultant sum signal to the input terminal of said variable gain element.

3. A receiver according to claim 1, wherein said control signal generating means includes separate rectifier means for respectively producing and applying said first and second signals to said comparing means.

4. A receiver according to claim 3, wherein said separate rectifier means includes first rectifier means for rectifying said difference signal S and producing said first signal, and second rectifier means for rectifying said second signal.

5. A receiver according to claim 2, wherein said control signal generating means includes first rectifier means for rectifying said difference signal S and generating said first signal as a direct current signal which substantially follows dynamic variations of said signal S, and second rectifier means for generating said second signal as a direct current signal which substantially follows variations of said third signal.

6. A receiver according to claim 4, wherein said means for comparing is operative to produce a direct current error signal which is proportional to the difference signal between said first and second signals, and wherein said control signal generating means includes means for processing said error signal to produce said control signal.

7. A receiver according to claim 5, wherein said means for comparing is operative to produce a direct current error signal which is proportional to the difference between said first and second signals, and wherein said control signal generating means includes means for processing said error signal to produce said control signal.

* * * * *